3,513,836
PROSTHESIS FOR CARDIAC ASSISTANCE
André Sausse, 26 Rue du Rocher, Paris 8, France
Filed Sept. 5, 1967, Ser. No. 665,412
Claims priority, application France, Sept. 5, 1966,
75,260; July 18, 1967, 116,158
Int. Cl. A61h *31/00*
U.S. Cl. 128—64                                            5 Claims

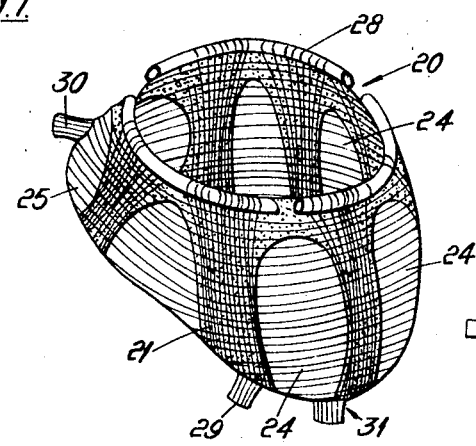
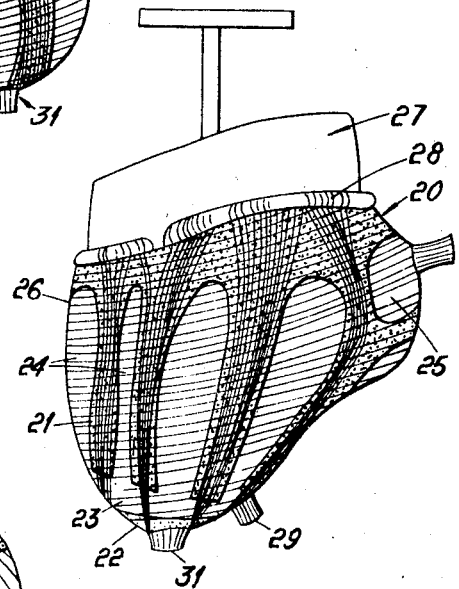
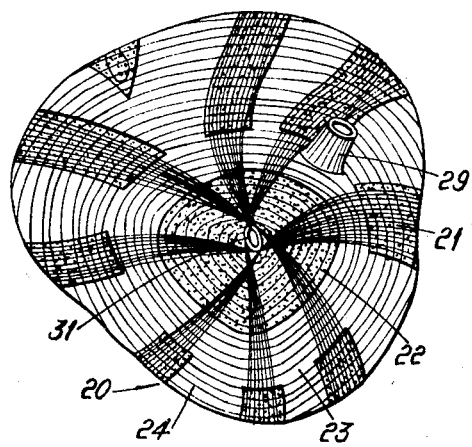
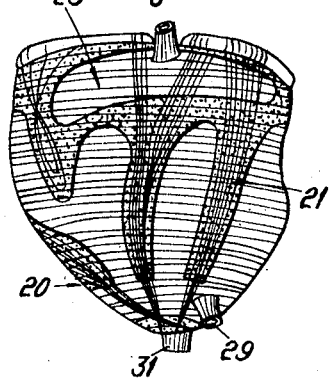

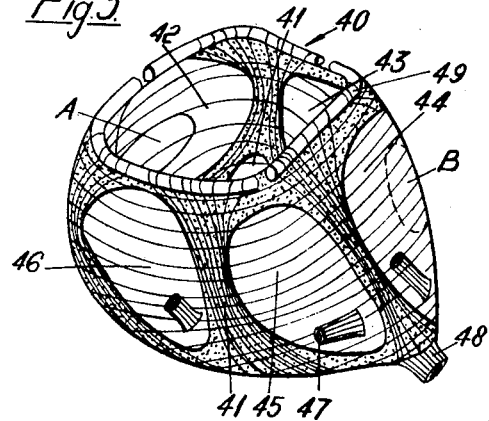
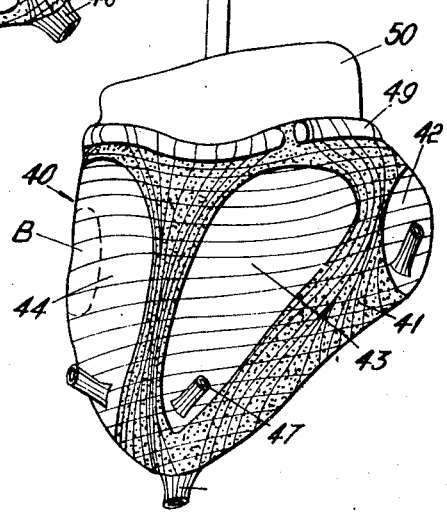
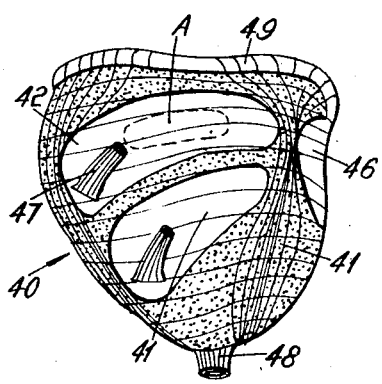
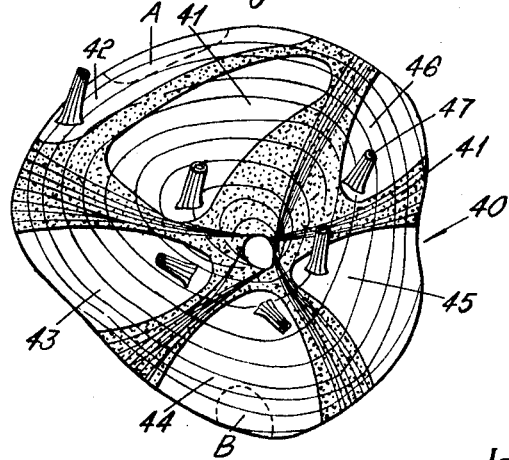

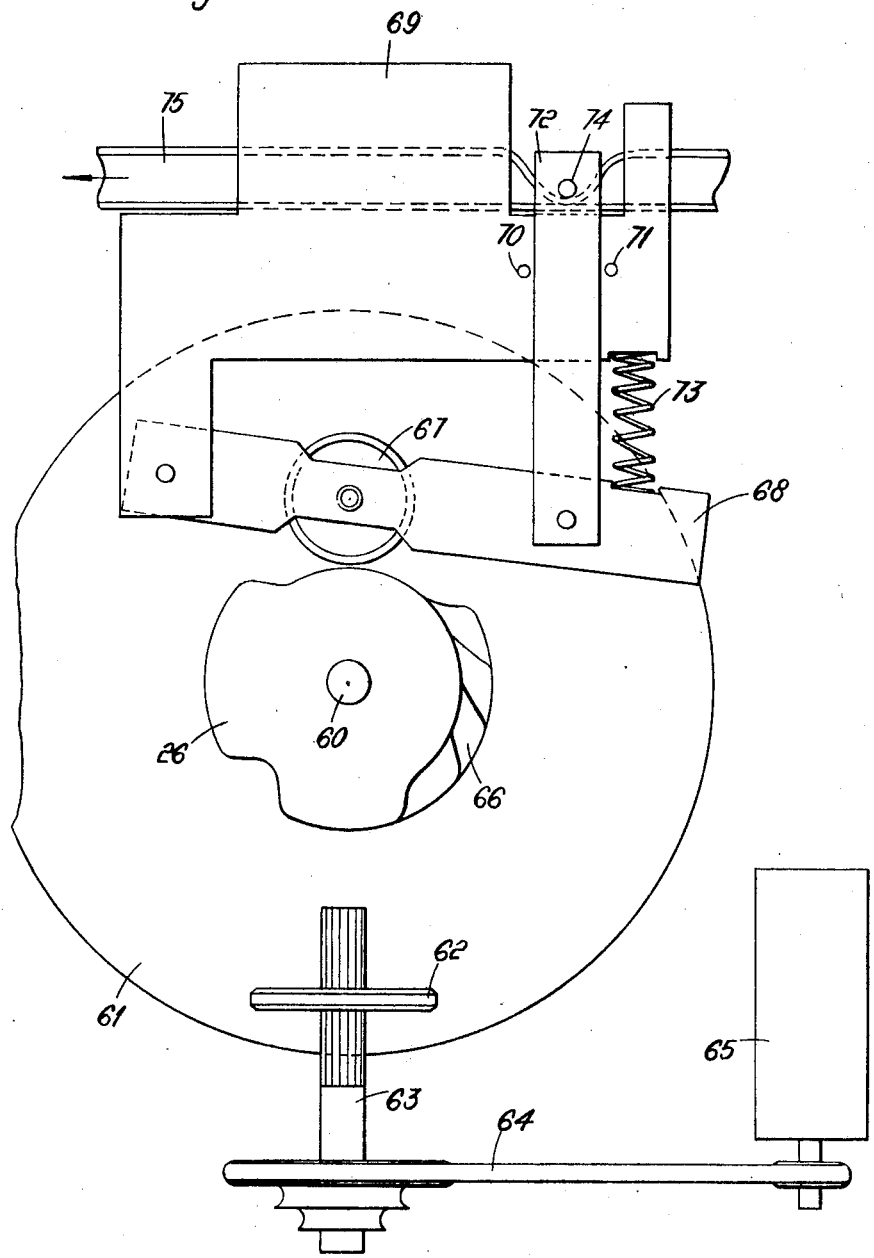

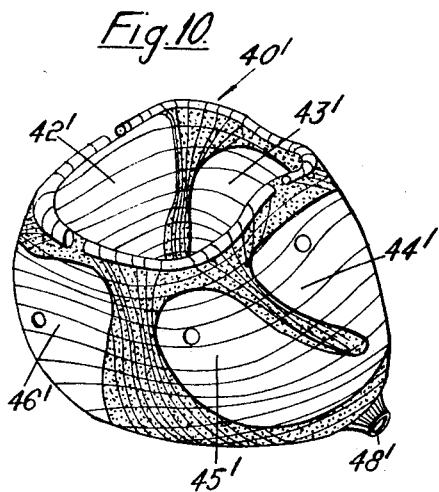
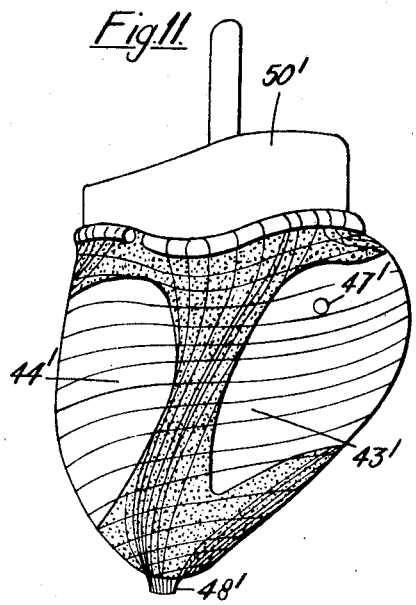
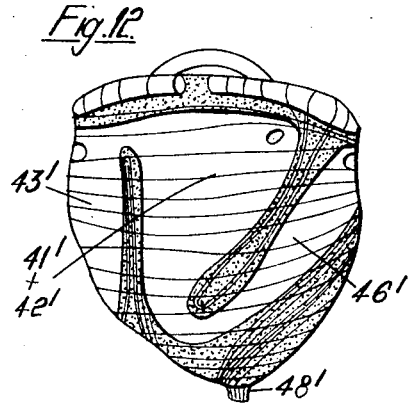
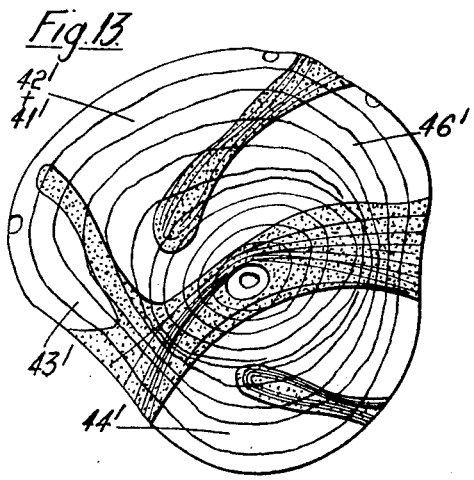
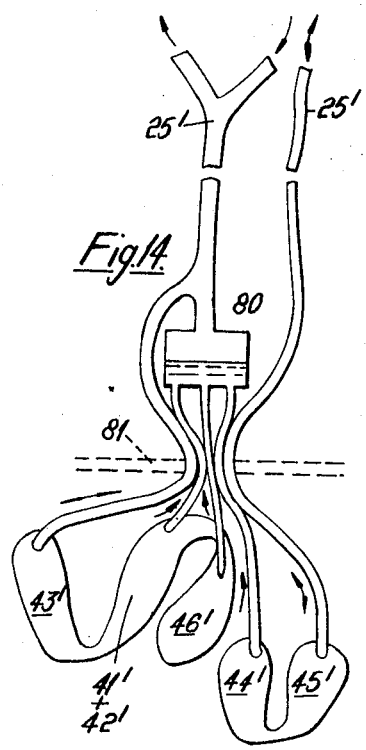

ABSTRACT OF THE DISCLOSURE

A device for cardiac assistance, the device taking the form of a flexible open topped double-walled pocket, the inner wall being flexible and elastic and having the form of a human heart in diastole, the outer wall being flexible and substantially inextensible, the space between the two walls being divided into bladders adapted to be filled with fluid and placed in communication with a pulsation generator.

---

The present invention concerns a prosthesis for cardiac assistance which is suitable for overcoming myocardial deficiencies and which can be used to effect artificial massage of the heart.

It is known that manual massage of the heart cannot be continued for a very long time; it effectiveness is small and it requires that the thorax should remain open throughout the period of the massage. The artificial heart and the extra corporeal circulation apparatus require artificial vascular anastomoses for their positioning, and the blood is obliged to circulate out of the vascular endothelium with considerable danger of impairment. In addition, the natural valvulae are not always used, although they are intact in isolated myocardial deficiency.

There has already been proposed a prosthesis for cardiac assistance which can be fitted around the defective member and which effects a mechanical massage. This prosthesis comprises essentially an elastic pocket consisting of thick rubber internally moulded to the dimensions of the heart in systole and attached in fluid-tight manner to a rigid external shell capable of containing the pocket in the diastole position. In this prosthesis, the ventricular repletion is obtained by creating a rhythmic reduction in pressure between the elastic pocket and the rigid shell, and the expulsion of the blood is obtained by the elastic recovery of the pocket, when the pressure is restored.

Such a prosthesis is disposed around the heart and within the pericardium, and it can be readily and rapidly placed in position. It has the advantage that it enables the blood to utilize its normal circuits and it necessitates the opening of the thorax only for its installation, so that normal respiration may be obtained throughout the duration of the massage. Finally, this prosthesis may be actuated by a simple and robust extracorporeal pump, a number of models of which already exist (see for example Techniques de l'Air Comprimé, March 1966, page 23). However, this type of prosthesis has various disadvantages.

Furthermore, it is necessary to synchronise the actuating pump and the spontaneous cardiac contractions, if they still exist or when they reappear. This is effected by applying to the motor of the prothesis a signal which corresponds to the onset of the said contractions, and which is detected by an electrocardiograph.

According to the invention there is provided a prosthesis for cardiac assistance, such prosthesis comprising a flexible open-topped double-walled pocket, the inner wall being flexible and elastic and having the form of a human heart in diastole, the outer wall being flexible and substantially inextensible, the space between the two walls being divided into bladders adapted to be filled with fluid and placed in communication with a pulsation generator.

The dimensions of the prosthesis are preferably such that it covers only the ventricular surfaces and such that its upper edge is set back from 2 to 3 mm. from the path of the right-hand and left-hand coronary arteries as far as the interventricular grooves; in addition, a concave recess is provided to free the pulmonary artery.

The prosthesis is composed of two walls of elastic material, e.g. polysiloxane elastomer, and these may be locally connected to form bladders. The external wall is inextensible by a reinforcement of glass or synthetic textile filaments, and the inner envelope may be merged and closely united with the external envelope, along the free edge of the pocket over a width of about 10 mm., and at all the points of the prosthesis where it is not necessary to have bladders.

These bladders, of which there are preferably 5 to 12, depending upon the dimensions of the prosthesis and the arrangement of the bladders, are distributed in well-defined zones of the prosthesis in accordance with their particular function.

In a first embodiment, the bladders are preferably elongate and oriented with their major axes parallel to the generatrices of the heart which converge towards the apex of the heart. The regions along which the walls are united have a width of about 4 to 5 millimetres and are interrupted at about 20 millimetres from the apex of the heart. In the region of the interventricular grooves they may be of double width so as to afford greater freedom to the coronary vessels situated therein. The bladders in this embodiment are bounded at the top by an arc of a circle and communicate at the bottom with an annular chamber which surrounds the apex of the heart. This chamber also comprise an outwardly directed reinforced zone to which a tube is attached for fluid (for example physiological serum) the pressure of which is pulsed by a pulsation generator situated outside the wall of the thorax.

The said bladders therefore consist of a flexible but substantially inextensible outer wall (reinforced by glass or synthetic textile filaments) and of an extensible inner wall.

On application of pressure, the inner wall alone increases its surface by bulging inwardly, while the outer wall can be deformed only in such manner that the convexity which it possesses in the state of rest is outwardly increased. Consequently, the regions which laterally bound the bladders move towards one another, which result in a contraction of the whole prosthesis, while the extensible walls press on the ventricular walls along a series of generatrices, the pressure gradually decreasing and even ceasing a little beyond the auricles.

The lower end of the prosthesis is formed with an orifice to permit drainage by suction, as also its positionings.

In accordance with another aspect of the invention, the upper part of the prosthesis which bounds its orifice is terminated by a hem around its upper edge. The said hem, which is 4 to 5 millimetres in diameter, is internally reinforced and is interrupted by a number, e.g. three of short incisions. The incisions are situated at regular intervals along the edge of the prosthesis, but do not correspond to the interventricular grooves or to the region of the orifice of the pulmonary artery when the prosthesis is in position. A lace may be disposed in the hem and its ends pass out through the front incision. By means of this lace, the prosthesis may be held fast in place by tightening the lace, without interfering with the coronary circulation, and may thus be made difficult to shift.

In accordance with another aspect of the invention, the upper third of the prosthesis corresponding to the right ventricle is occupied by an elongate bladder whose major axis is substantially perpendicular to the generatrices of the heart and which forms an independent, inwardly extensible cavity. It corresponds to the whole of the upper part of the right ventricle and is provided with its own supply tube. Amongst other functions, this bladder makes it possible to adjust the repletion volume of the right ventricle by means of a light positive pressure.

In addition, since the spontaneous contraction of the patient's heart will begin in this region, the disappearance, at the very beginning of the systole, of the diastolic counter-pressure exerted by the ventricular wall on this same bladder will give a signal i.e. a pressure reduction in the fluid with which it is filled. In accordance with another aspect of the invention, this signal may be employed outside the body to synchronise the pulsation generator. The signal thus obtained does not exist during the artificial contraction, and only natural contraction can supply it. The advantage of this mode of synchronisation over the use of the ventricular complex of an electrocardiogram is obvious.

A prosthesis for cardiac assistance according to the invention has considerable advantages over the known prostheses.

In the first place, the polysiloxane elastomer which is preferably employed for the construction of the envelopes of the prosthesis according to the invention is much more compatible with the organism than rubber, it renders possible much more flexible constructions and has better resistance to repeated flexure and ageing.

The prosthesis according to the invention operates under positive pressure in such manner that it permits the use of much thinner envelopes than are employed in prostheses operating under negative pressure, and the use of a rigid shell (which adapts itself much less readily to the heart) is unnecessary. Consequently, the number of "sizes" of prosthesis to be tried during the fitting or which must be provided before the intervention is reduced.

On the other hand, if a leakage occurs, or if the driving pump ceases to operate, prostheses operating under negative diastolic pressure leave the heart in forced systolic contraction, whereby any natural circulation which may exist or is in the course of being restored is suppressed. Only the extraction of the prosthesis in a period of a few minutes can then have the patient. With a systolic-pressure prostheses, according to the invention, since the inoperative position of the prosthesis is the diastole, the heart can function almost normally within the prosthesis; it is even possible to continue the assistance despite a light leakage of the transmission fluid by re-aspirating the latter during the diastole.

Owing to their fusiform shape, the bladders make it possible to apply to the heart a massage which is fairly similar to that which can be manually effected, but the points of action are more regularly distributed and their number is generally greater than that of the fingers of the hand, whereby better results are afforded.

The hem situated at the upper part of the prosthesis not only enables the apparatus to be secured by means of a lace extending therethrough, but it also performs an important function at the end of the artificial systole, since it exerts an additional pressure on the base of the ventricle, thus completing the systole.

Finally, the single bladder corresponding to a portion of the right ventricle makes it possible to adjust the pressure on this ventricle, while supplying the synchronising signal necessary for the actuating pump.

In order that the invention may be more readily understood, the following description is given, merely by way of example, reference being made to the accompanying drawings in which:

FIG. 1 is a perspective view of one embodiment of prosthesis according to the invention, from above and one side;

FIG. 2 is an elevation from the back and the other side of the prosthesis of FIG. 1;

FIG. 3 is a side elevation of the prosthesis of FIG. 1 as viewed from said other side;

FIG. 4 is an underneath plan view of the prosthesis of FIG. 1;

FIGS. 5 to 8 are views similar to FIGS. 1 to 4, respectively, of a second embodiment of prosthesis according to the invention;

FIG. 9 is a pulsation generator for use with a prosthesis according to the invention;

FIGS. 10, 11, 12 and 13 are views similar to FIGS. 1 to 4 respectively, of a third embodiment of prosthesis according to the invention; and FIG. 14 is a schematic view illustrating the connection of the bladders of the prosthesis according to the invention, through the wall of the patient's thorax, to the pulsation generator of FIG. 9.

Referring now to the embodiment of prosthesis according to the invention illustrated in FIGS. 1 to 4, the prosthesis consists of a double walled open topped flexible pocket 20. The outer wall of the pocket consists of a flexible inextensible material, and the inner wall is extensible. A number of downwardly extending partitions 21 and a central lower partition 22 divide the space between the inner and outer walls into an annular bladder 23, having a series of upwardly extending fingers 24 directed along generatrices of the prosthesis. A further bladder 25, which is isolated from the fingers 24 of the annular bladder 23 is defined by other partitions. A first series of reinforcing filaments are distributed parallel to the generatrices of the prosthesis in the form of bundles located in the partitions 21; the different bundles cross each other around the apex of the prosthesis. Further reinforcing filaments 26 extend in a generally horizontal direction transverse to the generatrices of the prosthesis. In FIG. 3, the prosthesis is shown as being mounted on a metal model 27, only the upper portion of which is visible in this figure.

Around the upper periphery of the prosthesis, the pocket is formed to provide an interrupted annular hem 28 for the passage of a lace, for securing the prosthesis in position on a patient's heart. The annular bladder 23 is provided with a pressure supply pipe 29, while the isolated bladder 25 has a supply pipe 30. A drain pipe 31 is provided at the bottom of the prosthesis.

FIGS. 5 to 8 illustrate a further embodiment of prosthesis according to the invention, which is again formed as a double walled open topped bag 40 the outer wall of which is flexible and inextensible and the inner wall of which is both flexible and extensible.

Vertically extending partitions 41, parallel to the generatrices of the prosthesis are joined adjacent the bottom of the prosthesis and divide the latter into a plurality of bladders. Two of these bladders 41 and 42 are located adjacent the right ventricle when in use, and are arranged to extend laterally i.e. prependicular to the generatrices of the prosthesis. Three further bladders 43, 44 and 45 extend parallel to the generatrices. If desired they may be between three and five of such bladders. Finally, there is a further bladder 46, which is positioned to expel the blood from the heart completely at the end of the systole and corresponds to the infundibular region adjacent the left ventricle. Each of the bladders is provided with a pipe 47 for connection to a pulsation generator situated outside the wall of the patients thorax. The lower part of the prosthesis is formed with an outlet orifice 48 which permits drainage by suction and also positioning of the prosthesis.

Around the upper periphery of the prosthesis, a reinforced beading of polysiloxane elastomer is provided. FIG. 6 also illustrates a metal model 50 on which the prosthesis is formed.

The bladders 42 and 44 are provided with elastic conductive surfaces A and B respectively, which are positioned adjacent the right and left ventricle of the patient respectively, and enable the ventricular wall to be palpated.

Thus each bladder may be independently supplied from a pulsation generator capable of acting in accordance with successive phases, so that, by appropriate adjustment, the heart may be massaged rationally, and different pressures may be exerted at different instants on each ventricle.

The two bladders having elastic conductive surface supply on conductivity measurements, the necessary information with regard:

(a) to the choice of an appropriate side of the prosthesis to permit perfect co-aptation of the viscera and of the prosthesis;
(b) to the continuous measurement during actuation, of the repletion of the ventricular cavities; and
(c) to the determination of the return of the heart to diastolic distention.

This continuous conductivity measurement permits synchronisation of the whole actuation as a function of the characteristic period of the heart by means of an appropriate information processor.

With a distribution and operation of the bladders as indicated above, when the prosthesis has been positioned, the bladders 42 and 44 with the conductive surfaces A and B are inflated until the signal is obtained indicating the contact with the ventricular wall in the diastole position. The prosthesis is kept only if a sufficient clearance exists between the ventricular wall and the prosthesis. The prosthesis considered to be suitable is connected to the actuation unit.

This actuation unit may consist of a compressor, of a fluid reservoir maintained under regulated pressure, a vacuum pump with the reservoir maintained under regulated vacuum and a pulse generator, for example a cam operated electromechanical system, which enables the applications of positive and negative pressure to the various bladders to be adjusted in accordance with the number of phases.

A suitable form of pulsation generator is illustrated in FIG. 9 and includes a shaft 60, keyed to a drive disc 61, which is driven by a friction wheel 62, the position of which on a shaft 63 can be adjusted along a radius of the disc 61, to vary the speed of rotation of the shaft 60 as desired. Shaft 63 is driven, via a belt drive 64, by a motor 65.

On the shaft 60 are mounted a plurality of cams 66, each of which is associated with a cam follower roller 67 carried on a separate arm 68, pivotally mounted on a fixed frame 69. Vertically reciprocable between two guides 70 and 71 is a transmission bar 72 comprising a pair of vertical parallel strips connected together at the top by a rod 74. As the cam 66 rotates, the cam follower 67 and bar 68 are forced downwardly under the action of spring 73 and the transmission bar 72, together with the rod 74, is forced downwardly, to form a restriction in a flexible tube 75. Two such tubes 75 are associated with each bladder of the prosthesis. One of the tubes 75 is connected to the vacuum pump, and the other to the compressor and the two tubes are connected together at a Y piece before connection to a bladder. Thus actuation by the pulsation generator illustrated in FIG. 9 serves to control the alternative action of the vacuum pump or the compressor to any one of the bladders of the prosthesis. Like for the tubes 75, the total number of cams required will be equal to twice the number of bladders. These cams may be disposed side by side on a common shaft 60 so as to compress the tubes assembled on the fixed frame. Each cam may comprise two halves having same radius and adapted to be partially superposed to any desired extent in order to conveniently adapt the relative active time of said cam. The cams are so adjusted that the application of positive pressure to the bladders is simultaneous, or out of phase, and so that the application of negative pressure from the vacuum pump is simultaneous for all of the bladders. The pressure and rates of inflation are so adjusted as to approach the maximum of the natural physiological values of the patient being treated.

When the heart is at the end of the systole, bladders to which negative pressure is applied bear against the wall of the prosthesis. From this instant, in use of the prosthesis in cardiac assistance, the bladder having conductivity surface palpate the ventricular wall by controlled inflation, so as to set up a fresh pseudosystolic pressure wave as soon as the desired filling of the ventricles is obtained, This pseudosystolic pressure wave is distributed in each bladder, so as to exert on the heart a massage which resembles natural physiological contraction of the heart.

In FIGS. 10, 11, 12 and 13 there is illustrated a third embodiment of prosthesis according to the invention. This construction is generally similar to the construction of FIGS. 5 to 8, and like reference numerals have been used for like parts, except that the reference numerals in FIGURES 10 to 13 have had a prime added. In this third embodiment the bladders are connected in series, so as to form a set of bladders 41', 42', 43' and 46' for massaging the right ventricle, and a separate set of bladders 44' and 45' for massaging the left ventricle. Only one bladder of each set is connected to the pressure generating apparatus, for example, only bladders 43' and 45' are connected, so that the bladders are not simultaneously inflated, but are inflated one after the other which permits an effective massage of the heart. The bladders preferably have at their end furthest from the apex of the heart, a pipe connected to the vacuum pump. This manner of connection ensures substantially simultaneous exhausting of the various bladders. Advantageously a single pipe is provided to effect the simultaneous application of positive and negative pressure to the bladders 43' and 45'.

In order to reduce the number of pipes connecting the bladders to the pulsation generator, the pipes may be advantageously regrouped outside the body of the patient, so as to form a single tube which is connected to the pulse generator or to form two tubes, if it is desired to inflate the sets of bladders separately. Thus, the bladders 41', 42', 44' and 46' are connected to a valve 80 (FIG. 14), which permits the simultaneous application of negative pressure, but oppose untimely application of positive pressure. The various pipes 25' have been clustered together to pass through the wall of the thorax 81.

Regardless of the arrangement of the bladders, the prostheses according to the invention may be made of elastomers, notably of methylpolysiloxane elastomers vulcanisable in the cold or preferably at an elevated temperature. In order to reinforce these elastomers, one may use filaments of glass or of synthetic material compatible with the elastomer, notably polyester-based filaments.

By means of the prosthesis according to the invention, the desired forces may be exerted upon the heart in the desired positions, in accordance with the dimensions and the arrangements of the bladders. The bladders may be simultaneously subjected either to the same pressure when they are connected to an annular chamber or are connected in series, or to any pressures when they are independent.

The following examples illustrate processes for the production of the protheses according to present invention.

EXAMPLE 1

In order to produce a prosthesis as shown in FIGS. 1 to 4, an aluminum model was made, by casting on a lost-wax pattern, which itself was made from a plaster cast of a heart in diastolic repletion. Only the ventricular volumes were reproduced and the volumes representing the auricles and the vessels were replaced by a cylinder which was slightly flattened along three generatrices. The sinuous auriculoventricular limit was marked on the model by a very rounded shallow depression. The metal model provided with a manipulating rod was coated with polytetrafluoroethylene to facilitate the mould release.

A fresh 12% solution of non-cross-linked methylpolysiloxane elastomer in toluene was prepared, to which was added dichlorobenzoyl peroxide (1.25% of the preceding mixture), to act as a catalyst.

The model was dipped into the solution to a height corresponding to that of the prosthesis and, after rapid draining off of the excess, the coating was uniformly distributed by rotation of the model at various angles. The rotation was maintained while drying was accelerated by a current of hot air at 30° to 40° C. When the drying was complete the material became opaque and whitish. The operation was repeated 20 times so as to obtain a coating of dry material about 1 mm. thick.

After a final prolonged drying, lasting at least 4 hours, reserves were disposed on the surface which had remained sticky to form cavities which constitute the bladders. In this example the reserves were in the form of sheets of polytetrafluoroethylene of a thickness of 0.1 mm. These can readily be cut to the desired shape, do not adhere to the vulcanised polysiloxane and have sufficient flexibility to be extracted, if desired, through the connecting channels of the prosthesis.

A series of dips into the polysiloxane elastomer, alternating with a series of dryings, was then carried out until a fresh thickness of 1 mm. was obtained.

In addition, a tubular braid of polyester yarn, having a diameter of about 4 mm., internally provided with a strip of polytetrafluoroethylene was dipped into the methylpolysiloxane solution and then dried. The operation was repeated 2 or 3 times, and the strip withdrawn and the reinforced elastomer tube thus obtained was cut into sections about 40 mm. long. Short sections of the said braid, having a length of 15–20 mm., were impregnated with the elastomer over a length of about 10 mm. and the filaments of the portion which had remained free were thereafter radially spread out.

Three substantially circular orifices of a diameter of about 5 mm. were then cut into the prosthesis, one at the centre of the outer wall of the isolated bladder, another in the anterior portion of the outer wall of the annular chamber, and the last one through the whole thickness of the prosthesis, at the apex.

A reinforcement of polyester filaments (diameter 10–50μ) was disposed along the generatrices which separate the bladders, without taking account of the isolated bladder 25, so as to extend well beyond the depression of the mould which borders the ventricular surface. The sections of reinforced elastomer tube were then disposed in the depression, whereafter the filaments of the reinforcement, bent around the tubes, were bent down along the generatrices and carefully applied to the unvulcanised material which was still sticky. Likewise, the tube sections were applied to the three orifices in the prosthesis, the splayed filaments being well spread out to serve as anchoring means.

The assembly was again covered with a thin layer of methylpolysiloxane, the previously described dipping and drying operations being repeated 4 or 5 times. The prosthesis on its mould was then introduced into a ventilated oven whose temperature gradually changed in 3 hours from ambient temperature to 125° C., the latter temperature being maintained constant for 30 minutes.

The prosthesis was then cooled and removed from the mould, whereafter the pockets or bladders are detached by light inflation and the reserves withdrawn through the tubular orifices. The prosthesis was baked for one hour at 160° C. in the ventilated oven in order to complete the vulcanisation and to drive off the residual solvent.

After cooling, cutting-off of the flash and cleaning of the outer surface by grinding, the prosthesis was covered with a primary coating based upon silicone resin and then with a light layer of methylpolysiloxane elastomer vulcanisable at ambient temperature in 50% suspension in cyclohexane.

After evaporation of the cyclohexane, a reinforcement perpendicular to the generatrices was produced with polyester yarn wound regularly around the prosthesis. This reinforcement, which was formed in the planes perpendicular to the large axes of the bladders, had a flexibility such as to permit deformation of the outer wall towards the outside, whereby the constriction of the prosthesis was increased on inflation of the bladders.

The whole assembly was finally covered with a final layer of methylpolysiloxane from the suspension in cyclohexane.

EXAMPLE 2

For producing a prosthesis in which the bladders are disposed in accordance with the second or third embodiment an aluminum model coated with polyetetrafluoroethylene was produced as in Example 1.

A fresh 12% solution of elastomer containing non-cross-linked methylpolysiloxane in toluene was prepared, whereafter dichlorobenzoyl peroxide (4% of the previous mixture) was added to the solution as a catalyst leaving non-toxic residues.

The model was dipped into the solution to a height slightly greater than that of the prosthesis (5 to 10 mm.) and, after rapid draining-off of the excess, the coating was uniformly distributed by rotation of the model at various angles. The rotation was maintained during the accelerated drying by a current of hot air at 30° to 40° C., the drying being complete when the material became dull. The operation was repeated about 20 times so as to obtain a coating of dry material about 1 mm. thick.

After final prolonged drying, lasting at least 4 hours, a water-soluble "reserve" was deposited upon the surfaces on which it was desired to form the bladders. Thus, an aqueous alcoholic solution of polyvinyl alcohol containing glycerol as a plasticiser and alkyl sulphonates or soaps as surface-active agents was applied with a brush. The viscosity of the whole was such that it adhered appropriately to the surface of the elastomer. The polyvinyl alcohol solution permits the production of bladders of all shapes and perfectly adapts itself to the concavities and convexities of the surface. Moreover, this solution forms after drying, a soluble film which can be readily dissolved after vulcanisation of the elastomer. Consequently, its use is preferred to that of the polytetrafluoroethylene employed for the same purpose in the preceding example. It would also be possible to preform separate soluble sheets by coating a model with a solution of water-soluble film-forming material e.g. polyvinyl alcohol or polyvinyl pyrrolidone, followed by drying and separation, and to deposit these sheets on the still tacky elastomer.

A further series of dips was then carried out in the polysiloxane elastomer solution, alternating with a series of dryings until a further thickness of 1 mm. was obtained.

In addition, a tubular braid consisting of yarn of polyester or other textile, having a diameter of about 4 mm., in which there was disposed a strip of polytetrafluoroethylene was dipped into the solution of polymethylsiloxane and then dried. The operation was repeated 2 or 3 times, whereafter the strip was withdrawn and the elastomer tube thus obtained was cut into sections about 30 mm. long.

These sections were impregnated with elastomer over a length of about 10 mm., and the yarns of the portion which had remained free were thereafter radially spread out. These splayed braids were disposed at the appropriate points of the bladders during the second series of dips. These tubes thus anchored in the thickness of the outer wall of the prosthesis serve as relays for the pipes for the supply of actuating fluid.

The assembly was again coated with a thin layer of polysiloxane, the previously described dipping and drying operations being repeated 4 or 5 times. The upper edge of the prosthesis was then rolled to form a regular beading around the whole aperture of the prosthesis.

The prosthesis on its mould was then introduced into a ventilated oven whose temperature gradually changed in 3 hours from ambient temperature to 125° C., the latter temperature being maintained constant for 30 minutes.

The prosthesis was then cooled and removed from the mould, whereafter the pockets or bladders were detached by light inflation and the reserves were dissolved by washing with tepid water.

The outer wall was covered with a primary coating based upon silicone resin or any other material appropriate for the bonding. Then, after light drying, it was covered with a light coating of polysiloxane elastomer, if desired in suspension in cyclohexane, which was vulcanisable at ambient temperature. Silicone tubes were disposed at the ends of the outlets of each bladder and were applied to the outer wall of the prosthesis and assembled in the form of a cluster. With the aid of the last elastomer, a conductive surface, for example consisting of carbon-loaded semi-conductor elastomer, about 2 cm. thick was stuck to the detection bladders. Conductive wires under a silicone sheathing connect these surfaces to the appropriate circuits.

A glass gauze reinforcement (thickness 100µ) was disposed over the whole surface of the prosthesis, the outlet of the cluster of tubes being left free. A last layer of elastomer was applied to coat all the tubes of the glass gauze.

I claim:

1. A prosthesis for cardiac assistance, said prosthesis comprising in combination:
   (a) a flexible double-walled pocket;
   (b) an open top and a bottom to such pocket;
   (c) an inner flexible and elastic wall to such pocket, formed to the shape of a human heart in diastole on generatrices extending between said open top and said bottom;
   (d) an outer flexible and substantially inextensible wall to said pocket;
   (e) fluid fillable bladders located between said inner and outer walls; and
   (f) means for connecting said bladders with a pulsation generator.

2. The prosthesis defined in claim 1, wherein the bladders are of elongate form, major axes to said bladders extending generally parallel to the generatrices of the heart shape of the inner wall, and an annular chamber formed between the inner and outer walls adjacent said bottom and connected to each said bladder, said connecting means being connected to said annular chamber.

3. The prosthesis defined in claim 2, and further comprising a further bladder, independent of said bladders connected to said annular chamber, said further bladder being located adjacent the upper third of the right ventricle of said heart shape of said inner wall.

4. The prosthesis defined in claim 1, including means connecting the bladders together in two groups, the bladders of a group being connected in series, one group positioned adjacent each ventricle of said heart shape.

5. A prosthesis for cardiac assistance, said prosthesis comprising in combination:
   (a) a flexible double-walled pocket;
   (b) an open top and a bottom to such pocket;
   (c) an inner flexible and elastic wall to such pocket, formed to the shape of a human heart in diastole on generatrices extending between said open top and said bottom;
   (d) an outer flexible and substantially inextensible wall to said pocket;
   (e) a space defined between said inner and outer walls;
   (f) a pulsation generator;
   (g) control means controlling the operation of said pulsation generator;
   (h) means connecting said space to said pulsation generator;
   (i) a fluid filled bladder located between said inner and outer walls adjacent the upper third of the right ventricle of said heart shape; and
   (j) pressure detector means associated with said bladder effective to signal said control means to initiate operation of said pulsation generator in response to a pressure drop in said bladder.

References Cited

UNITED STATES PATENTS

| 2,826,193 | 3/1958 | Vineberg | 128—64 |
| 3,034,501 | 5/1962 | Hewson | 128—64 |
| 3,053,249 | 9/1962 | Smith | 128—64 |
| 3,376,863 | 4/1968 | Kolobaw et al. | 128—64 |

L. W. TRAPP, Primary Examiner